May 28, 1940.  C. HILDABRAND  2,202,452

SYSTEM FOR DETERMINING QUANTITIES OF RAINFALL OVER LARGE GEOGRAPHICAL AREAS

Filed Nov. 3, 1936  6 Sheets-Sheet 1

Inventor
Carl Hildabrand

Attorney

May 28, 1940.                C. HILDABRAND                2,202,452
SYSTEM FOR DETERMINING QUANTITIES OF RAINFALL OVER LARGE GEOGRAPHICAL AREAS
                    Filed Nov. 3, 1936            6 Sheets-Sheet 2

Inventor
Carl Hildabrand
By John B. Grady
        Attorney

Inventor
Carl Hildabrand
By John O. Brady
Attorney

May 28, 1940. C. HILDABRAND 2,202,452
SYSTEM FOR DETERMINING QUANTITIES OF RAINFALL OVER LARGE GEOGRAPHICAL AREAS
Filed Nov. 3, 1936 6 Sheets-Sheet 5

INVENTOR.
Carl Hildabrand,
BY
John B. Brady
ATTORNEY.

Patented May 28, 1940

2,202,452

UNITED STATES PATENT OFFICE 2,202,452

SYSTEM FOR DETERMINING QUANTITIES OF RAINFALL OVER LARGE GEOGRAPHICAL AREAS

Carl Hildabrand, Manila, P. I.

Application November 3, 1936, Serial No. 109,052

21 Claims. (Cl. 177—351)

My invention relates broadly to systems for determining rainfall quantity data for a large geographical area, and more particularly to an automatic electrically operated transmitting and recording system for indicating at a central station the rainfall within the area at any time.

This application is a continuation in part of my copending application, Serial No. 731,994, filed June 22, 1934, for System for determining quantities of rainfall over large geographical areas.

One of the objects of my present invention is to provide a wholly independent system for the transmission of rainfall data which will be reliable under any weather conditions.

Another object of my invention is to provide an isolated transmitting unit for the transmission of rainfall data from any locality desired regardless of power facilities, and automatically without personal attention.

A further object of my invention is to provide a high frequency, transmission system for linking one or a plurality of rain gauge stations with a central observing and recording station for determining rainfall data for a large geographical area automatically at the central station.

Still another object of my invention is to provide a method of transmitting rainfall data from automatic rain gauge field stations by unmodulated different high frequency signals, receiving the signals at a central station and actuating recording devices thereby.

A still further object of my invention is to provide a method of transmitting rainfall data from automatic rain gauge field stations by differently modulated high frequency signals, receiving the signals at a central station and actuating recording devices thereby.

Still another object of my invention is to provide a high frequency electron tube transmitter automatically controlled by rainfal in the vicinity of the transmitter for first connecting power to the electron tube circuits and subsequently signalling rainfall data by means of the high frequency transmitter.

A still further object of my invention is to provide means for automatically controlling a high frequency electron tube transmitter by rainfall in the vicinity of the transmitter, which means include a pair of successively operated switches, the first for connecting power to the electron tube circuits and the second for signalling rainfall data over the then operative high frequency transmitter.

Still another object of my invention is to provide an improved receiving circuit arrangement for a rain gauge system.

Other and further objects of my invention reside in the methods, circuit arrangements, and apparatus hereinafter more fully described, with references to the accompanying drawings, in which:

Figs. 2-6 are schematic diagrams showing high frequency space transmission systems; Figs. 2 and 3 show a single station transmitter and receiver respectively, with Fig. 2 and Fig. 2a showing relatively open and closed positions of the keying switches; Fig. 4 shows a type of transmitting circuit adaptable for multiple station systems; Figs. 5 and 6 show different types of receiving circuits operable in combination with a plurality of transmitters of the type shown in Fig. 4; Fig. 7 is a representation of the type of record made at an observing station by a single gauging station.

My invention provides means for accurately measuring quantities of rainfall over wide geographical areas and establishes a permanent record of the conditions of rainfall at a central observing station. My invention is particularly applicable in irrigation projects where it is highly important to have accurate rainfall data, which influences the amount of artificial irrigation which may be supplied to different geographical areas. My invention is particularly applicable also, to flood control where life and property may be protected when accurate data is available as to the quantity of rainfall in geographical areas by observations made from a remote position which may be far removed from the flood area. The accurate data provided by the remote rain gauge system of my invention is particularly important in the operation of hydroelectric generator systems as the readings taken at the central observing station provide the station operator or load dispatcher with advance knowledge of rainfall conditions in the water shed, thereby enabling the operator or load dispatcher to prejudge the load which the hydroelectric stations might carry and to proportion the total load more economically between the hydroelectric generating stations and supplementary steam powered generating stations. Another application of my invention resides in its use in agricultural projects where crop statistics are related to rainfall conditions. Moreover, the system of my invention provides the first practical method of accurately and automatically recording weather bureau information, so useful as statistical data in analyzing natural phenomena and predetermining probable conditions of weather.

In the systems of my invention I provide generally battery operated circuits in order that the systems will be wholly independent of interruptions such as result from failure of commercial power supplies during storm periods. Or, as in some instances, the gauges and transmitting units may be in isolated localities remote from other power facilities. The system of my invention is completely automatic and will accurately record for observtaion at a remote central point or points the amount of the rainfall as it occurs in the various sections of a given geographical area.

Figure 1:
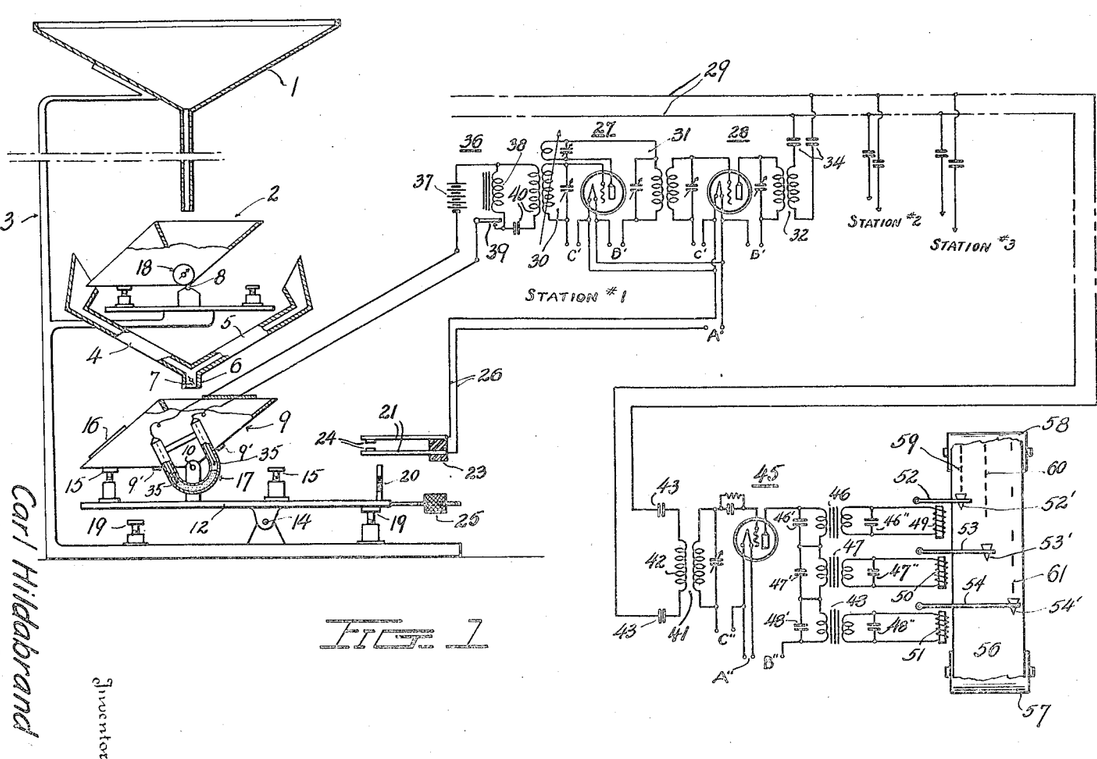
Figure 1 is a schematic diagram showing transmission of signals by carrier current over line wires of a power or telephone circuit.

Referring to the drawings in more detail, Fig. 1 schematically illustrates a carrier current line wire transmission system with switch actuating control mechanism shown diagrammatically. Rain gauge apparatus comprising a catch funnel 1 and tip bucket 2 are mounted on arms projecting from the support 3. Fluid ducts 4 and 5 are provided on either side of the tip bucket and connected together to discharge fluid through a central discharge member 6 provided with a control valve 7 for regulating the rate of flow and incidentally the length of time between the discharge of bucket 2 and bucket 9. The ducts 4 and 5 align with the bucket 2 as the bucket tips on pivot 8 from one discharge position to the other discharge position. A second bucket 9 generally similar to the bucket 2 is arranged to receive the fluid discharged through the central member 6. The second bucket 9 is pivotally mounted at 10 on a lever member 12 which is also of itself pivotally mounted, as represented at 14. The bucket 9 is adapted to pivot at 10 under the weight of the load of part of the rain water delivered thereto. Adjustable bumpers or stops 15 are mounted upon lever 12 for accurately limiting the displacement and adjusting the tipping point of bucket 9. The bucket 9 is adjusted to tip with slightly less water than bucket 2, and therefore is constructed different from bucket 2 in that it is provided with bleeder pipes 9' which allow any water to leak off which may collect in the opposite bucket after the working bucket has discharged and the transmitting apparatus made inoperative, thereby insuring that the lever arm will not be returned to the closed switch position upon the cessation of rainfall by an accumulated excess of water.

The slotted cover member 16 for bucket 9 insures a delayed discharge of fluid from bucket 9 so that the electrical control circuit will remain closed for the required length of time to perform a signal operation even though the bucket 9 may tip to a discharge position. In the arrangement of Fig. 1, a mercury control switch 17 is mounted on one side of bucket 9 while a mechanical counter 18 is mounted at one side of bucket 2. The lever 12 which is pivotally supported at 14 is free to move within limits defined by adjustable bumpers 19 located beneath lever 12. The lever 12 carries a member 20 thereon which is adapted to contact with leaf spring members 21 which are supported in insulated relation by insulation means 23 and which carry contact members 24.

A suitable counter balance member and adjustable weight 25 is carried by lever 12 and is so adjusted that slight increase in weight of receptacle 9, due to fluid discharged thereinto from bucket 2 through member 6, results in the tipping of the lever 12 and the closing of contacts 24, which contacts are connected through leads 26 with the cathode circuit of the high frequency oscillator 27 and power amplifier 28. The high frequency oscillator 27 illustrates one form of high frequency source which may be employed for impressing carrier currents on the line wire system 29 illustrated in Fig. 1. I do not intend that my invention is to be limited to the use of any particular form of high frequency oscillator as I may employ any standard form of oscillator and power amplifier equipment of sufficient size to impress the required carrier current energy on the line circuit 29. Accordingly, I have merely illustrated the circuits of the oscillator 27 in a symbolic manner and have shown a tuned input circuit generally at 30, and an output circuit at 31 inductively coupled to the input circuit 30 and coupled through power amplifier 28 with the output inductance shown at 32 which is capacitatively coupled through condensers 34 with the line wire circuit 29. Any suitable source of power may be employed for the oscillator and power amplifier system but I have indicated generally a preference for standard battery sources of power at A', B' and C'.

The several rain gauge stations located at spaced intervals along the line wire circuit operate in accordance with the unit depth of rainfall whereby the electrodes 35 of mercury switch 17 when closed during the tipping operation of bucket 9 serve to complete the circuit to any suitable form of low frequency modulating device illustrated generally at 36. For the purpose of illustrating my invention, I have shown a small buzzer modulator in which a source of potential 37 drives the buzzer constituted by solenoid 38 and armature or vibrator 39, and to which vibratory circuit is connected an oscillatory circuit 40 adapted to transfer the low frequency oscillations to the input circuit 30 to modulate the carrier current. I employ modulation frequencies of the order of 500 cycles, 1000 cycles and 1500 cycles, to distinguish the several rain gauge stations. The carrier current impressed upon the line wire system is thus modulated at any one of three distinct low frequencies depending upon the rain gauge station which may be rendered effective by rainfall at that station.

The modulated carrier frequency is transmitted over the line wire circuit 29 to the central observing station. A high frequency coupling transformer 41 has its primary winding 42 connected with line wire circuit 29 through suitable coupling condensers 43. A suitable detector 45 is connected to transformer system 41. For purposes of simplification, I have shown an electron tube detector having terminals for power supply sources at A'', B'' and C''. The output circuit of the detector 45 includes low frequency transformers each tuned to a particular one of the low frequencies used for modulation purposes at the several rain gauge stations such as I have indicated at 46, 47 and 48. That is to say, low frequency transformer 46 has its primary and secondary windings tuned by condensers 46' and 46'', respectively, to the modulation frequency emitted by rain gauge station #1. Low frequency transformer 47 has its primary and secondary windings tuned by condensers 47' and 47'' to the modulation frequency emitted from rain gauge station #2. Low frequency transformer system 48 has its primary and secondary windings, respectively, shunted by condensers 48' and 48'' for selectively responding to the modulation frequency emitted by rain gauge station #3.

The separate frequency responsive circuits connect to separate solenoid members which I have indicated at 49, 50 and 51 which control separate armature members indicated at 52, 53 and 54, respectively. The armature members each carry a siphon recorder or stylus member. The stylus members each operate to impress a graphic record upon the moving tape or chart 56 which is progressively moved while the recording apparatus is in operation from the drum 57 to the drum 58 under suitable power delivered from clockwork mechanism or other form of driver. The stylus members have been shown at 52', 53', and 54', serving to trace a record in the form of dashes impressed at spaced intervals along the band 56 in the event that the receptacle 2 at the remote rain gauge station successively fills and empties as a result of a continuous downpour of rain which is the condition pictorially represented by the record 59. However, the condition may prevail where the downpour of rain ceases at rain gauge station #2 in which event, the graphic record will appear as at 60, that is, the graphic record will continue throughout only a portion of the tape or chart 56. On the other hand, the condition of rainfall at rain gauge station #3 may be such that the graphic record will appear as indicated at 61, that is, the marks impressed by the stylus needle will be less frequent along the tape or chart indicating a light fall of rain.

Figures 2, 2A, 3:
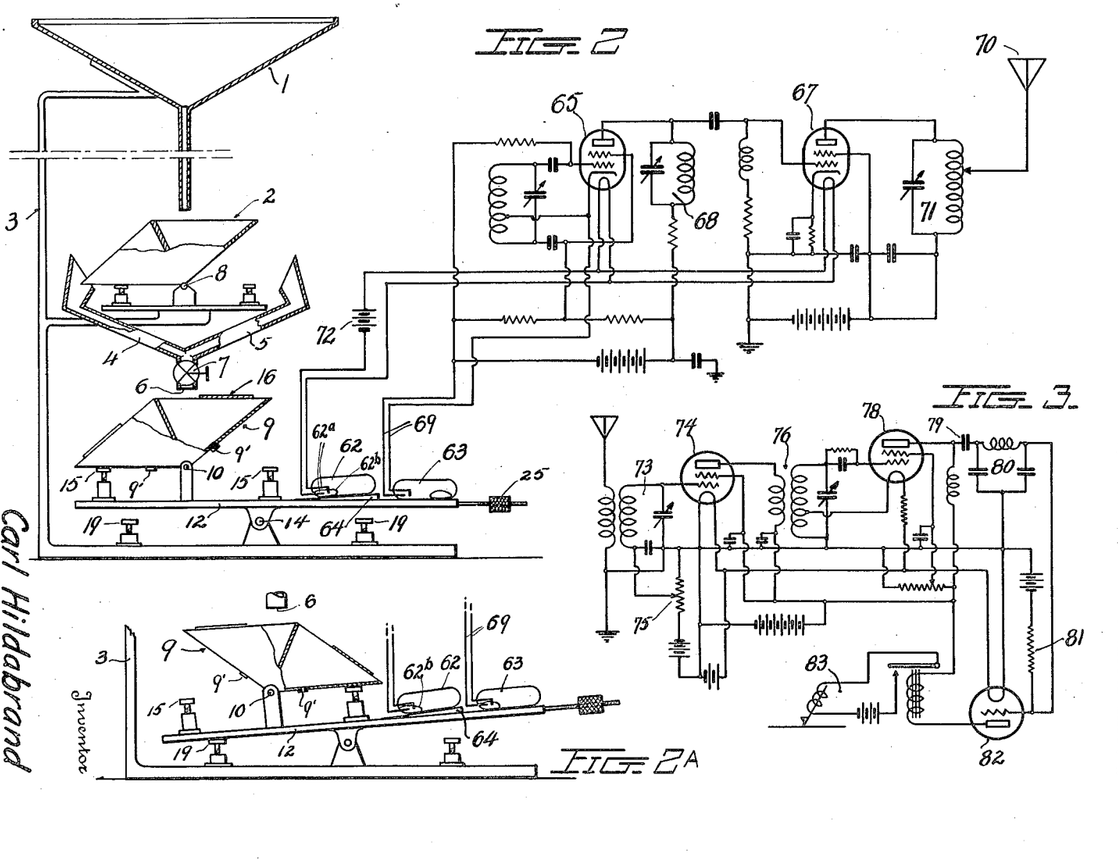

Fig. 2 shows a type of unmodulated oscillator adapted to be keyed by the operation of the rain gauge to emit an interrupted continuous wave signal. Fig. 2 shows the rain gauge apparatus substantially as described in connection with Fig. 1 but employing a modified form of switch device. In the arrangement of Fig. 2, both switch devices 62 and 63 are of the mercury bulb type, are alike, and mounted on the lever arm 12 conveniently on the side of the pivot opposite from the tip bucket 9, as shown. In order that the proper sequence of operation may be effected with the switch arrangement of Fig. 2, one of the switch devices is arranged at an angle with respect to the other by means of the inclined member 64 provided as a support for the switch device 62. The inclined member is disposed with its vertical edge remote from the pivot so that contacts 62a in the switch device 62 are contacted by the mercury 62b prior to the similar operation in the device 63. Contacts 62a, therefore, are connected in the filament circuits of the transmitter and close the circuit therethrough energizing the circuits for control by the switch 63.

The transmitter circuit of Fig. 2 is adapted to transmit high frequency signals through space to the central observing and recording station. The circuit comprises an oscillator stage 65 and an amplifier stage 67, coupled through a tuned circuit 68. The grid and plate circuits of the oscillator stage are connected by the switch device 63 through leads 69 with the cathode of the oscillator tube to establish an operable relation of potentials in the circuits. The output of the amplifier stage feeds into an antenna system 70 through the tuned circuit 71. It will be noted that battery sources of power are provided throughout, with the source 72 supplying the filament current for the tubes in both the oscillator and amplifier stages under the common control of the switch device 62. It will thus be seen that with the circuits energized by the prior action of switch device 62, the operation of switch device 63 causes an unmodulated wave of a certain duration to be emitted from the antenna 70. When the bucket 9 has emptied and the counterweight 25 restores the lever 12 to its normal position, both circuits are again open and the transmitter is inoperative. Fig. 2 shows the lever in mid-position with contacts 62a in switch 62 already connected by the mercury 62b while switch 63 remains open. Fig. 2a shows the lever 12 in actuated position with both the switch devices 62 and 63 closed, just prior to the return of the lever 12 to normal position.

In combination with the transmitter shown in Fig. 2, I provide a receiving system at a central observing and recording station, of the type illustrated in Fig. 3. The circuit shown in Fig. 3 comprises a tuned input circuit 73 coupling the antenna with a high frequency amplifier stage 74, in circuit with which is an amplitude control device 75. Tuned coupling 76 interconnects the amplifier with a detector stage 78 provided with slight regeneration in the input circuit to increase the effectiveness thereof. The output of the detector stage 78 then is a direct current fluctuating in the half cycles of the rectified high frequency current. This current is passed by the coupling condenser 79, which however blocks the plate potential from the grid of the succeeding tube. After passing through the condenser 79, the rectified current is filtered in the high frequency filter circuit 80, which includes choke and by-pass elements, and fed as a substantially direct current through the resistor 81 to provide a potential for the grid of an amplifier tube 82. The amplifier 82 connects to a relay recorder device 83 which is thus energized under the control of the rectified high frequency current to record the signal impulse initiated by the filling of the bucket 9 at the transmitting station.

Figure 4:
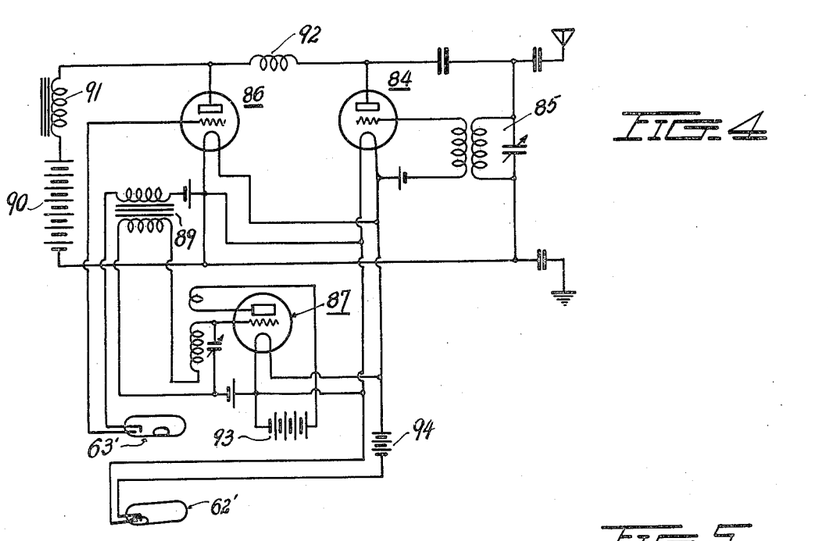
Figure 5:
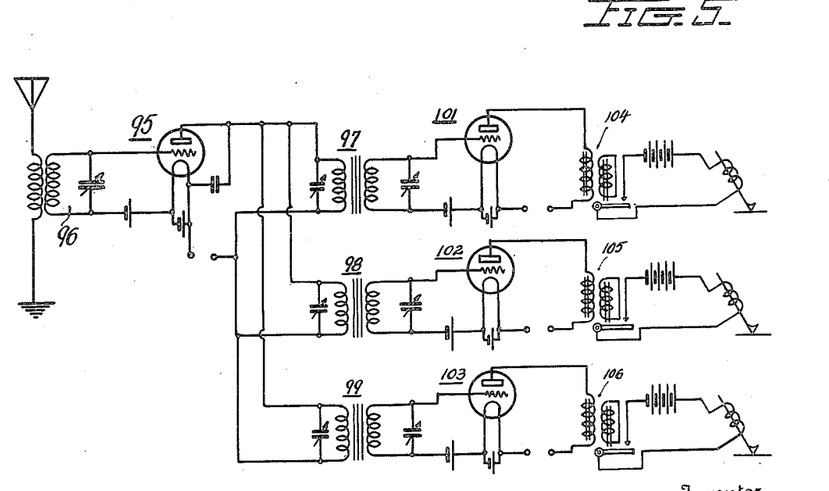
Figures 6, 7:
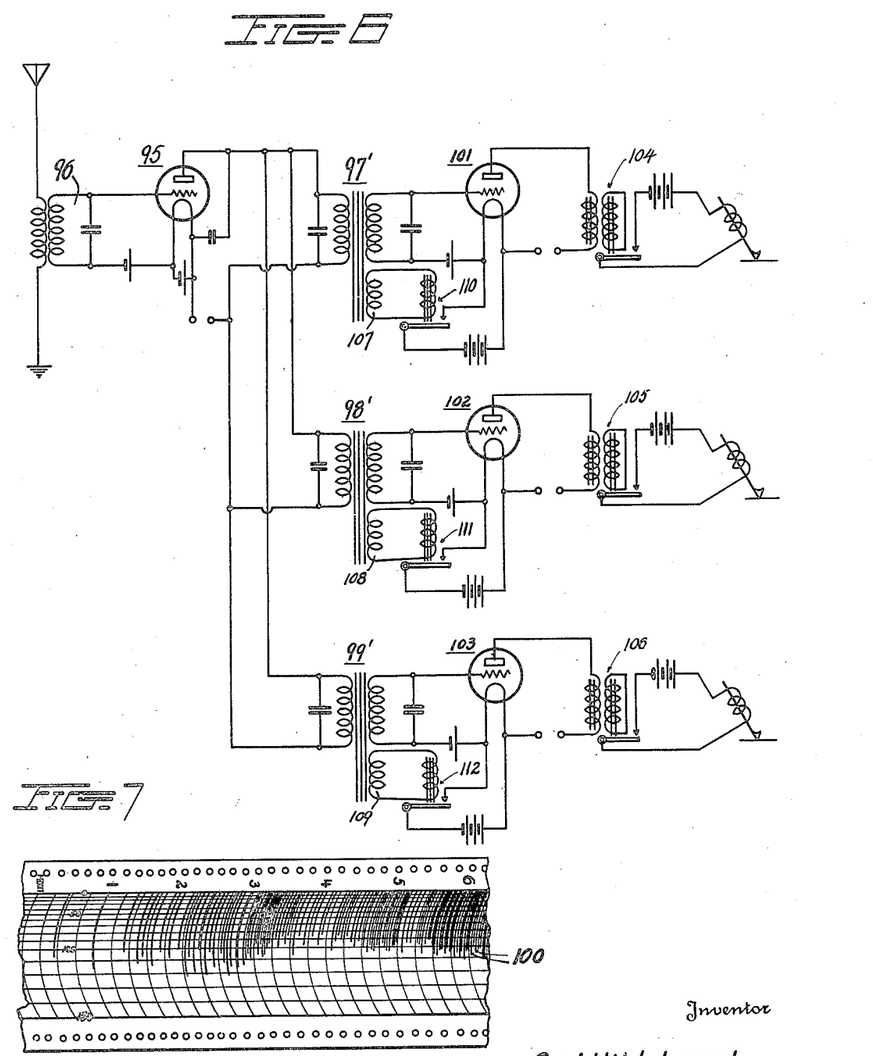

In Figs. 4, 5 and 6, I illustrate an arrangement for the space transmission of rainfall data from a plurality of remote unattended rain gauge stations. In such a system, modulated carrier currents are employed in the manner illustrated in Fig. 1. Unmodulated high frequency waves could be employed with a plurality of systems of the type shown in Figs. 2 and 3, and the waves would each have a different frequency. While the frequency separation need not be great, because there would be no side band modulation, such a system might be objectionable where the frequency range is limited. Instead, in the system of Figs. 4, 5 and 6, a single carrier frequency is selected and the carrier wave modulated by a plurality of low frequency oscillations.

Referring particularly to Fig. 4, which shows a modulated high frequency transmitter, the circuit comprises a high frequency oscillation generator 84 of the feed-back type having a tuned output circuit 85 coupled with antenna and ground. A modulator stage 86 connects with the output circuit of the oscillator 84 and operates to modulate the high frequency wave radiated from the antenna. A modulation frequency of selected value is supplied by an external oscillator 87, which may be of any suitable type providing a constant frequency oscillation. The oscillator 87 is coupled with the input circuit of the modulator stage 86 through a transformer 89. Power for the modulator and high frequency oscillator stages is supplied from a battery source 90 connected through a low frequency choke coil 91 to the modulator stage and high frequency choke coil 92 to the oscillator stage. Power for the external oscillator is supplied from a separate battery 93. Grid bias potentials may be supplied from battery sources, as indicated. The filament elements of all tubes are energized from a common battery source 94 through a switch device 62' associated with the rain gauge in the manner indicated in Figs. 1 and 2. Keying of the system is effected by switch device 63', likewise associated with the rain gauge in the manner illustrated in Figs. 1 and 2, and connected in the input circuit of the modulator stage 86. Thus, in operation, switch 62' is first closed to energize the transmitter system and generate a carrier, and subsequently the carrier is modulated in accordance with the operation of the rain gauge through switch device 63' to transmit the signal to the central recording and observing station.

Fig. 5 shows one circuit arrangement for receiving signals from a plurality of stations of the type illustrated in Fig. 4. With a plurality of stations, different modulation frequencies are employed, the external oscillator 87 being designed in each case to supply a different low frequency wave, while the carrier current in each instance is of the same frequency. In the receiving system of Fig. 5, I provide a detector circuit 95, coupled with an antenna system through a tuned circuit 96, for rectifying all waves of a selected frequency passed by the tuned circuit 96. I provide selective circuits in the output of the detector 95 operative to separate the several modulation frequencies into individual channels, in the form of tuned low frequency circuits 97, 98 and 99, shown connected in parallel with the output of the detector, though a series arrangement may be equally desirable. These selective circuits are connected with individual electron tube amplifier stages 101, 102 and 103, respectively, in the output circuits of which are connected separate relay devices for actuating individual recording means. The relay devices are shown at 104, 105 and 106 connected respectively with amplifier stages 101, 102 and 103, each controlling a circuit through a source of power and an actuating winding of a recorder device.

The recorder may be of the type shown in Fig. 1, or may be any suitable device such as a Bristol time recorder which is equipped with two or more solenoid operated pens and which would answer the purpose where the rainfall data from a plurality of gauging stations was being recorded at a central station or an Esterline-Angus recording voltmeter where the data from a single station was being recorded. The type of record made with a recording voltmeter is shown in Fig. 7 wherein each arcuate marking 100 indicates one millimeter depth of rainfall. The record which was made by the signal impulses of a gauging station situated nine miles distant, is that of the actual rainfall in the water shed behind the Botocan Hydroelectric Plant at Botocan, Philippine Islands, between twelve and six o'clock on the morning of December 24, 1935, during which time a heavy rainfall was experienced. During an eight hour period on December 24, 1935, 654 millimeters of rainfall were recorded in this instance, the chart in Fig. 7 showing but a portion of the record.

Fig. 6 shows a receiving system of the general type of Fig. 5 but embodying a modification in the filament circuits of the amplifier tubes for separately controlling the energization of the tubes in order to decrease the average power consumption of the system. The tuned selective circuits 97', 98', 99', each include a transformer with tuned input and tuned output circuits. In addition to the tuned output circuit associated with each transformer, I provide, in the arrangement of Fig. 6, a separate secondary winding 107, 108, or 109, coupled with the tuned input circuit and connected with a relay device 110, 111, or 112, respectively, for controlling the filament circuit individually in the associated amplifier tube. The relays throughout where radio is used as a means of transmission are of the slow-acting type and are actuated only by signal energy and not by static, or other transient interfering energy, the duration of the signal impulses being sufficient to allow for the closing of all relays in circuit and the recording of substantially identical marks. Thus the detector 95 only is continuously operative to receive modulated carrier waves at the common carrier frequency, and each selective circuit is individually energized by signal energy of the corresponding frequency and operative by signal energy only to actuate the recorder associated therewith.

Referring to Figs. 8–12, I have shown a modified form of my invention in which the lower tipping bucket may be dispensed with. By use of this modified construction, a quicker and more positive opening and closing of the control switches is obtained. Also I arrange the mechanical counter in a wholly different location. This arrangement serves a double purpose. Firstly it gets all extraneous devices off the top tipping bucket, thereby contributing to its accuracy in measuring the quantity of rainfall; and secondly it assists, due to the actuating lever of the counter, being attached, with a coil spring in series, to the outer end of the short end of the lever, in starting the counter weight back to the open switch position when the water has drained from the lower receptacle.

Figure 8:
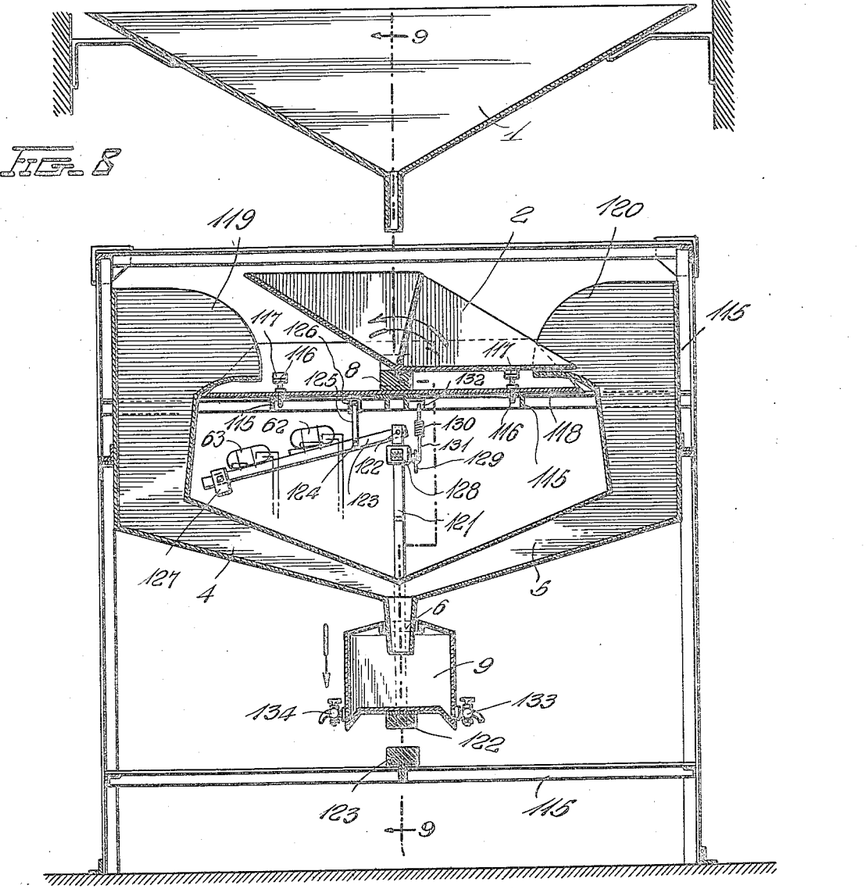
Fig. 8 is a longitudinal sectional view taken through a modified form of rain gauge apparatus embodying my invention.
Figure 9:
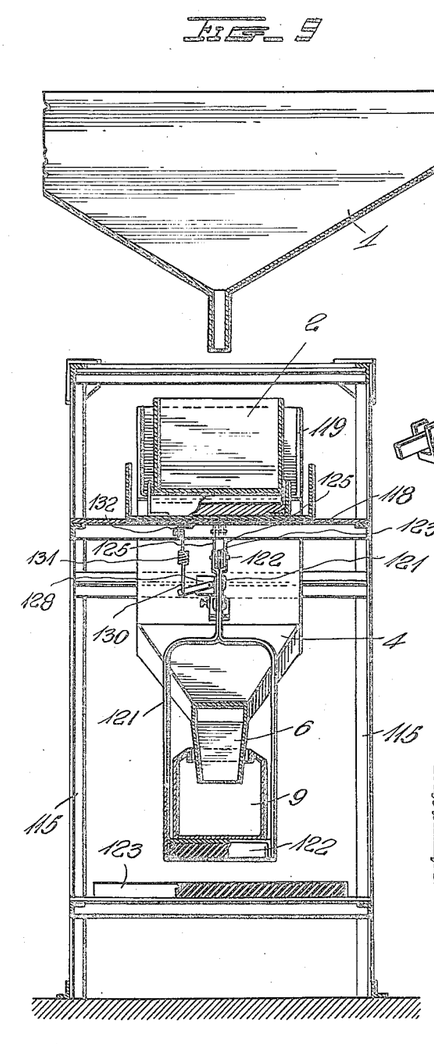
Fig. 9 is a transverse sectional view taken on line 9—9 of Fig. 8.
Figures 10, 11:
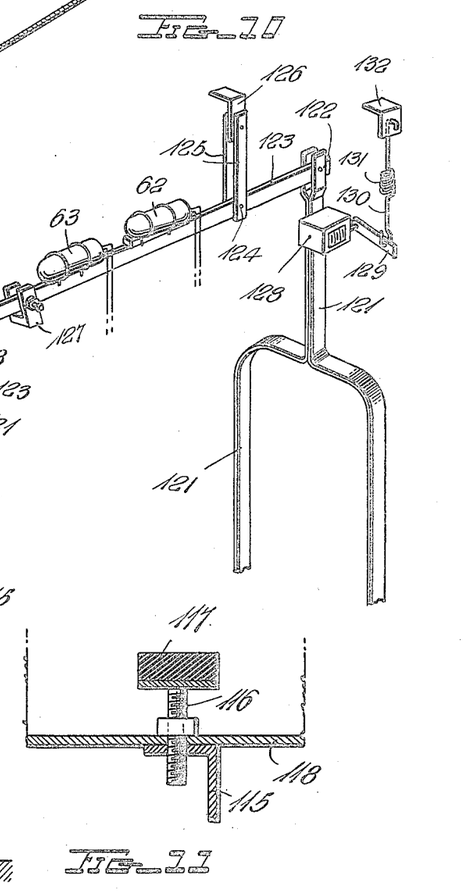
Fig. 10 is a perspective view of the lever mechanism controlled by the rain gauge bucket.
Fig. 11 is a detailed cross-sectional view showing one of the adjustable stops employed in the mechanism of Figs. 8 and 9.

Referring to Fig. 8, I have shown the catch funnel 1 supported over the frame structure 115 which serves as a support for the rain gauge apparatus. The tipping bucket or upper receptacle 2 rocks about the pivot block 8 and has limits controlled by the adjustable bumpers 116. The adjustable bumpers 116 each carry a resilient pad 117 on the top thereof and are secured to selected positions through transversely extending supporting plate 118 and the angle member constituting part of the frame and indicated generally as 115. The ducts 4 and 5 are provided with the fluid receiving portions constructed as indicated at 119 and 120 through which the rain is delivered and discharged through central member 6. In this arrangement the valve 7 is eliminated. The rain water is delivered to the lower receptacle 9 which is supported by the hanger which I have indicated at 121.

The hanger 121 is pivoted at 122 through a yoke connection adjacent the end of lever 123. The lever 123 is pivoted at 124 upon the end of member 125 which depends from the bracket 126 attached to the undersurface of the transversely extending supporting plate 118. The end of lever 123 is equipped with an adjustable counter-weight 127. The counter-weight 127 may be adjusted to selected positions along the length of lever 123. The lever 123 carries the control switches 63 and 62 arranged in a manner similar to the switches illustrated in Figs. 2 and 2a. A mechanical counter 128 is supported on hanger 121. The step by step shaft movement of the mechanical counter 128 is controlled by the lever 129 which is connected through hook element 130 and coil spring 131 to the bracket 132 which is secured beneath the transversely extending supporting plate 118. By this arrangement all extraneous devices are removed from the top tipping bucket for increasing the accuracy in measurement of the quantity of rainfall. Due to the actuating lever of the counter shown at 129, being attached with a coil spring 131 in series to the outer end of the short end of the lever 123 assisting force is provided for starting the counter-weight end of the lever back to the open switch position when the water has drained from the lower receptacle 9.

I provide drain cocks 133 and 134 in the lower receptacle 9. By controlling the drain cocks 133 and 134 the time period, between the closing and opening of the switches can be regulated. As heretofore pointed out, this arrangement permits the elimination of the valve 7, illustrated in Figs. 1 and 2.

Figure 12:
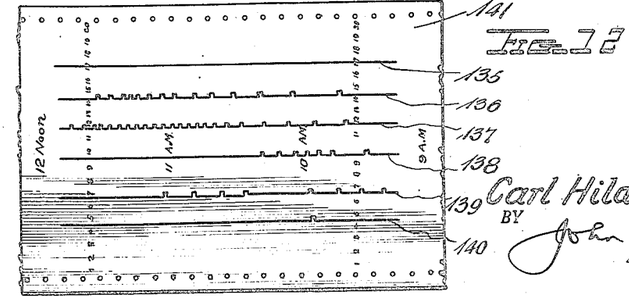
Fig. 12 shows a sample of a record where the rainfall data of several gauging stations is recorded at a central point through apparatus constructed in accordance with my invention.

In Fig. 12 I have shown a specimen of a chart record for observing the rainfall data of several gauging stations at a central point. The chart is advanced by a time operated mechanism while a siphon recorder controlled by the different rain gauge stations makes a permanent record on the chart as indicated by the different curves 135, 136, 137, 138, 139 and 140. The quantity of rainfall in the different rain gauge stations may be readily compared to the relative station comparing the curve on the chart 141. It is apparent that at rain gauge station 135 there has been no rainfall, while at rain gauge station 140 there has been a slight amount of rainfall shortly before 10:00 A. M. At the other rain gauge stations various quantities of rainfall are indicated on the chart at different time periods.

The equipment required in a given application of the system of my invention will depend upon the area to be considered, the distances to be covered by the transmitted signals, frequency bands available, and such natural factors as the terrain of the area, and atmospheric conditions prevalent therein. The system of my invention, therefore, may be modified in many ways to be adapted to particular circumstances. My disclosure herein is made in the illustrative sense and no limitations upon my invention are intended, except as are imposed by the scope of the appended claims.

What I claim as new and desire to secure by Letters Patent of the United States is as follows:

1. In a system for determining the quantity of rainfall over wide geographical areas, a multiplicity of rain gauge stations, a central observing and recording station, a transmission system interconnecting said rain gauge stations with said central observing and recording station, means at each of said rain gauge stations responsive to a partial unit depth of rainfall for impressing signaling energy on said transmission system, separate means at each of said rain gauge stations operative upon each unit depth of rainfall for modulating the signal energy impressed upon said transmission system with a characteristic distinguishing each of said rain gauge stations, and means at said central observing and recording station for selectively registering the modulated signals transmitted from each of said rain gauge stations for determining by the registered impulses the unit depths of rainfall at each of the rain gauge stations.

2. In a system for determining the quantity of rainfall over wide geographical areas, a multiplicity of rain gauge stations, a central observing and recording station, a transmission system, interconnecting said rain gauge stations with said central observing and recording station, means at each of said rain gauge stations responsive to a partial unit depth of rainfall for impressing signaling energy on said transmission system, separate means at each of said rain gauge stations operative upon each unit depth of rainfall for producing a tone frequency in the signaling energy impressed on said transmission system, the tone frequencies emitted from each of said rain gauge stations differentiating one from another, and means at said central observing and recording station responsive to the tone frequencies emitted by said rain gauge stations for recording the tone frequency signal impulses transmitted from said rain gauge stations and indicating thereby the unit depths of rainfall at each of said rain gauge stations.

3. In a system for determining the quantity of rainfall over wide geographical areas, a multiplicity of rain gauge stations each operative in successive cycles in accordance with unit depths of rainfall, a central observing and recording station, a transmission circuit interconnecting said rain gauge stations with said central observing and recording station, means at each gauge station for impressing a high frequency carrier current upon said transmission circuit, means at each gauge station for rendering the aforesaid means effective in response to a partial unit depth of rainfall, separate means at each of said rain gauge stations and operative with each cycle of operation of the respective station for modulating the carrier current with a characteristic individual to each of said rain gauge stations, and means at said central observing and recording station selectively responsive to the modulated signals for indicating the unit depths of rainfall at each of said rain gauge stations.

4. In a system for determining the quantity of rainfall over wide geographical areas, a multiplicity of rain gauge stations each operative in successive cycles in accordance with unit depths of rainfall, a central observing and recording station, a transmission circuit interconnecting said rain gauge stations with said central observing and recording station, means at each gauge station for impressing a high frequency carrier current upon said transmission circuit, means at each gauge station for rendering the aforesaid means effective in response to a partial unit depth of rainfall, means at each of said separate rain gauge stations and operative with each cycle of operation of the respective station for effecting a tone frequency modulation of the carrier current, the tone frequency emitted by one rain gauge station distinguishing from the tone frequency emitted by any other rain gauge station, and means at said central observing and recording station responsive to the tone frequencies emitted by said rain gauge stations for selectively indicating the unit depths of rainfall at each of said rain gauge stations.

5. In a system for recording the quantity of rainfall over wide geographical areas, in combination, a rain gauge device, a plurality of switch mechanisms operatively connected with and actuated by said rain gauge device, signal transmission means having power supply circuits connected therewith, one of said switch mechanisms connected in the said power supply circuits for controlling the energization of said transmission means, and the other of said switch mechanisms connected with said transmission means for determining the signal output of said signal transmitting means.

6. In a system of the type described in claim 5, means combined with one of said switch mechanisms relative to the other whereby the first said switch mechanism is actuated prior to the actuation of the second said switch mechanism by said rain gauge device whereby said transmission means is energized prior to the operation of the switch mechanism for determining the signal output of said signal transmitting means.

7. Automatic measuring and control apparatus comprising a frame structure, means for collecting rainfall, and means for measuring and discharging unit quantities of rainfall mounted on said frame structure; a lever member pivoted on said frame structure, means pivotally mounted with respect to said lever member and actuated by the said unit quantities of rainfall discharged, the last said means being adapted to pivot with respect to said lever and said lever being adapted to pivot with respect to said frame structure upon each discharge of a unit quantity of rainfall; electrical circuit control means actuated from the last said means, and separate electrical circuit control means actuated from the said lever member.

8. Automatic measuring and control apparatus as described in claim 7 wherein the control means actuated from the lever member is operative prior to the aforesaid control means which comprises a momentarily operative switch device, the lever member actuated means being rendered inoperative subsequent to the momentary operation of the other control means.

9. Automatic measuring and control apparatus as described in claim 7 and including means combined with one of said control means relative to the other whereby the control means actuated from the lever member is operative prior to the aforesaid control means.

10. Automatic measuring and control apparatus as described in claim 7 wherein the control means actuated from the lever member is operative prior to the aforesaid control means, and adjustable counterbalance means mounted on said lever member for regulating the time interval between the actuation of the two said control means.

11. Automatic measuring and control apparatus comprising a frame structure, means for collecting rainfall, a pivoted device having two compartments for alternately measuring unit quantities of rainfall, a second pivoted device having two compartments alternately positioned for receiving the rainfall from the first said pivoted device and adjusted to operate with slightly less than the unit quantity of rainfall, a bleeder pipe in each compartment of the said second pivoted device for preventing an increased excess of rainfall at each operation of said second pivoted device, and signalling means actuated from said second pivoted device for indicating unit quantities of rainfall.

12. Automatic measuring and control apparatus comprising in combination, a frame structure, means for measuring and discharging unit quantities of rainfall mounted on said frame structure, a lever member pivoted on said frame structure and having actuating means operated by unit quantities of rainfall discharged by the first said means, a plurality of electric circuit control means operatively related to said lever member, and actuated with each discharge of unit quantity of rainfall, and means combined with one of said control means relative to another whereby the one is disposed for operation prior to said other of said control means.

13. In a system which includes a central station for observing and recording unit quantities of rainfall, a rain gauge station including a transmitting system for transmitting unit signal impulses to the central observing and recording station, a control apparatus for said transmitting system comprising means responsive to a partial unit quantity of rainfall for rendering the transmitting system operative, and means for controlling the transmission of signals according to the unit quantity of rainfall and rendering said transmitting system ineffective after the transmission of a signal representative of the unit quantity of rainfall at the rain gauge station.

14. In a system which includes a central station for observing and recording quantities of rainfall, a rain gauge station including a transmitting system for transmitting signal impulses to the central observing and recording station, a control apparatus for said transmitting system comprising means for accumulating a predetermined unit depth of rainfall, means effective upon the accumulation of a predetermined unit depth of rainfall for initiating said transmission system in operation and transmitting a signal impulse to the central observing and recording station for indicating the quantity of rainfall at the rain gauge station, and means for interrupting the operation of said transmitting system after the transmission of each signal impulse representative of a predetermined unit depth of rainfall.

15. In a system for determining the quantity of rainfall over wide geographical areas from a multiplicity of rain gauge stations, each including a signal transmitter for transmitting signal impulses to a central observing and recording station, a rain gauge station including a signal transmitter, means for accumulating and measuring a predetermined unit depth of rainfall, means for controlling the operation of the signal transmitter according to the quantity of rainfall accumulated by said first mentioned means for effecting the transmission of a signal, and means for interrupting the operation of said signal transmitter upon discharge of the accumulated unit depth of rainfall whereby signal impulses interpretative of the unit depth of rainfall at the rain gauge station are transmitted to the central observing and recording station.

16. In a system for determining the quantity of rainfall over wide geographical areas which includes a multiplicity of rain gauge stations, each including a signal transmitter arranged to coact with a central observing and recording station, a rain gauge station, a signal transmitter associated with said rain gauge station, a control apparatus including means for accumulating and discharging a predetermined unit depth of rainfall, means controlled by accumulation of a portion of said predetermined unit depth of rainfall for initiating said signal transmitter in operation, means controlled by the accumulation of the whole of said predetermined unit depth of rainfall for effecting the transmission of a signal from the signal transmitter, the operation of the transmitter being interrupted upon discharge of the accumulated predetermined unit depth of rainfall whereby a signal impulse having a duration proportional to the time of discharge of the accumulated unit depth of rainfall is transmitted.

17. A rain gauge station adapted to transmit signal impulses interpretative of the depth of rainfall to a central observing and recording station comprising a signal transmitter, means for receiving a predetermined unit depth of rainfall, means actuated by the aforesaid means for energizing said signal transmitter responsive to a portion of said predetermined unit depth of rainfall, means effective upon the reception of said predetermined unit depth of rainfall by said first mentioned means for effecting the transmission of a signal impulse through said signal transmitter, and means effective upon discharge of the unit depth of rainfall for interrupting the operation of said signal transmitter whereby a signal having a duration proportional to the time required for discharge of the predetermined unit depth of rainfall is transmitted to the central observing and recording station.

18. A rain gauge station comprising a signal transmitter, a control apparatus for said transmitter, said control apparatus including a centrally fulcrumed balance, a circuit controller adjacent one end of said centrally fulcrumed balance, a power circuit for energizing said signal transmitter connected through said circuit controller, means for receiving a predetermined unit depth of rainfall disposed adjacent the opposite end of said balance and responsive to a portion of said predetermined unit depth of rainfall for actuating said balance for closing said circuit controller and energizing said signal transmitter, said means for receiving a predetermined unit depth of rainfall being adapted to retain a part of the predetermined unit depth of rainfall over a predetermined time period and discharge the rainfall after the lapse of the said time period, and means effective upon the reception of the predetermined unit depth of rainfall for initiating the transmission of a signal by said signal transmitter and for interrupting the operation of said signal transmitter after the discharge of the predetermined unit depth of rainfall.

19. A rain gauge station comprising a signal transmitter, a control apparatus for the signal transmitter including means for accumulating a predetermined unit depth of rainfall, a mass actuated device movable to either of two limiting positions under control of the weight of the accumulated predetermined unit depth of rainfall and adapted to receive and retain the predetermined unit depth of rainfall over a predetermined time period, an electrical circuit controller disposed in circuit with power supply means and connected with said signal transmitter, said circuit controller being operated in response to a portion of said predetermined unit depth of rainfall for effecting energization of said signal transmitter, an auxiliary circuit controller operative under control of said mass actuated device for effecting the transmission of a signal from said signal transmitter upon delivery of the accumulated predetermined unit depth of rainfall and to interrupt the operation of said signal transmitter upon discharge of the predetermined unit depth of rainfall from said mass actuated device.

20. A rain gauge station comprising a signal transmitter, a control apparatus for the signal transmitter including means for accumulating a predetermined unit depth of rainfall, a mass actuated device movable to either of two limiting positions under control of the weight of the accumulated predetermined unit depth of rainfall and adapted to receive and retain the predetermined unit depth of rainfall over a predetermined time period, an electrical circuit controller disposed in circuit with power supply means and connected with said signal transmitter, said circuit controller being operated in response to a portion of said predetermined unit depth of rainfall for effecting energization of said signal transmitter, an auxiliary circuit controller operative under control of said mass actuated device for effecting the transmission of a signal from said signal transmitter upon delivery of the accumulated predetermined unit depth of rainfall and to interrupt the operation of said signal transmitter upon discharge of the predetermined unit depth of rainfall from said mass actuated device, and means for counterbalancing said mass actuating device for adjusting the duration of transmission of the signal under control of the accumulated predetermined unit depth of rainfall.

21. In a system for determining the quantity of rainfall over wide geographical areas, a multiplicity of rain gauge stations each operative in accordance with unit depths of rainfall, a central observing and recording station, means for transmitting unit depth signal impulses characteristic of each of said rain gauge stations from said rain gauge stations to said central observing and recording station, and means at said rain gauge stations responsive to a partial unit depth of rainfall for rendering said transmitting means initially effective and responsive to the full unit depth of rainfall for subsequently controlling said transmitter means to transmit signal impulses to said central observing and recording station for determining the unit depths of rainfall at each of the rain gauge stations.

CARL HILDABRAND.